(12) United States Patent
Wang et al.

(10) Patent No.: US 10,223,035 B2
(45) Date of Patent: Mar. 5, 2019

(54) SCALABLE STORAGE SPACE ALLOCATION IN DISTRIBUTED STORAGE SYSTEMS

(71) Applicant: VMware, Inc., Palo Alto, CA (US)

(72) Inventors: Wenguang Wang, Santa Clara, CA (US); Yunshan Lu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 175 days.

(21) Appl. No.: 14/839,853

(22) Filed: Aug. 28, 2015

(65) Prior Publication Data

US 2017/0060432 A1 Mar. 2, 2017

(51) Int. Cl.
*G06F 3/06* (2006.01)
*H04L 29/08* (2006.01)

(52) U.S. Cl.
CPC ............ *G06F 3/067* (2013.01); *G06F 3/0604* (2013.01); *G06F 3/065* (2013.01); *G06F 3/0631* (2013.01); *G06F 3/0683* (2013.01); *H04L 67/1097* (2013.01)

(58) Field of Classification Search
CPC ........ G06F 3/067; G06F 3/0604; G06F 3/065; G06F 3/0683; G06F 17/30324; H04L 67/1097
USPC ........................................................ 709/217
See application file for complete search history.

(56) References Cited

U.S. PATENT DOCUMENTS

| | | | | |
|---|---|---|---|---|
| 6,032,216 A * | 2/2000 | Schmuck | ............... | G06F 9/52 707/999.01 |
| 6,185,663 B1 * | 2/2001 | Burke | ............... | G06F 11/1471 707/999.202 |
| 7,107,272 B1 * | 9/2006 | Milligan | ........... | G06F 17/30997 |
| 8,719,533 B2 * | 5/2014 | Terayama | ............. | G06F 3/0607 711/154 |
| 8,793,290 B1 * | 7/2014 | Pruthi | .................... | G06F 3/0604 707/821 |
| 2006/0129778 A1 * | 6/2006 | Clark | .................... | G06F 3/0613 711/170 |
| 2010/0211737 A1 * | 8/2010 | Flynn | .................... | G06F 3/0616 711/114 |
| 2010/0306445 A1 * | 12/2010 | Dake | ..................... | G06F 3/0604 711/6 |
| 2011/0282917 A1 * | 11/2011 | Desai | ....................... | G06F 9/52 707/803 |
| 2015/0199414 A1 * | 7/2015 | Braginsky | ......... | G06F 17/30132 707/613 |
| 2015/0244795 A1 * | 8/2015 | Cantwell | ........... | G06F 17/30575 709/202 |

OTHER PUBLICATIONS

Lee, Edward K.; "Petal: Distributed Virtual Disks"; http://www.thekkath.org/documents/petal.pdf; pp. 1-9; 1996.

* cited by examiner

*Primary Examiner* — Thomas J Dailey
*Assistant Examiner* — Lam H Duong
(74) *Attorney, Agent, or Firm* — Loza & Loza, LLP

(57) ABSTRACT

System and method for managing storage metadata utilize a metadata data structure containing allocation information of storage blocks of a storage system in which a portion of the metadata data structure that corresponds to a group of the storage blocks can be reserved to a requesting client, which then manages the portion of the metadata data structure using a copy of the portion of the metadata data structure.

20 Claims, 7 Drawing Sheets

SCALABLE STORAGE SPACE ALLOCATION IN DISTRIBUTED STORAGE SYSTEMS

BACKGROUND

Currently, there is an unprecedented need for scalable high performance storage and data management, partly due to the wide use of cloud computing. Large distributed storage systems have been developed to satisfy this need for scalable high performance storage and data management. In these large distributed storage systems, data operations such as read and write operations are typically decoupled from metadata operations to ensure fast access to storage devices. Although fast access to storage devices is an important criterion for a distributed storage system, efficient metadata management is critical in achieving high performance and scalability.

In a typical distributed storage system, one or more specialized metadata servers are used to manage metadata for the storage system, including metadata related to storage space allocation. Even with multiple metadata servers, numerous accesses to the metadata servers by clients can create bottlenecks at the metadata servers, which can degrade the performance of the storage system and can limit the scalability of the storage system. Thus, reducing communications between the clients and the metadata servers to ease potential bottlenecks at the metadata servers is essential to achieving scalability and high performance for a distributed storage system.

BRIEF DESCRIPTION OF THE DRAWINGS

Throughout the description, similar reference numbers may be used to identify similar elements.

DETAILED DESCRIPTION

Figure 1:
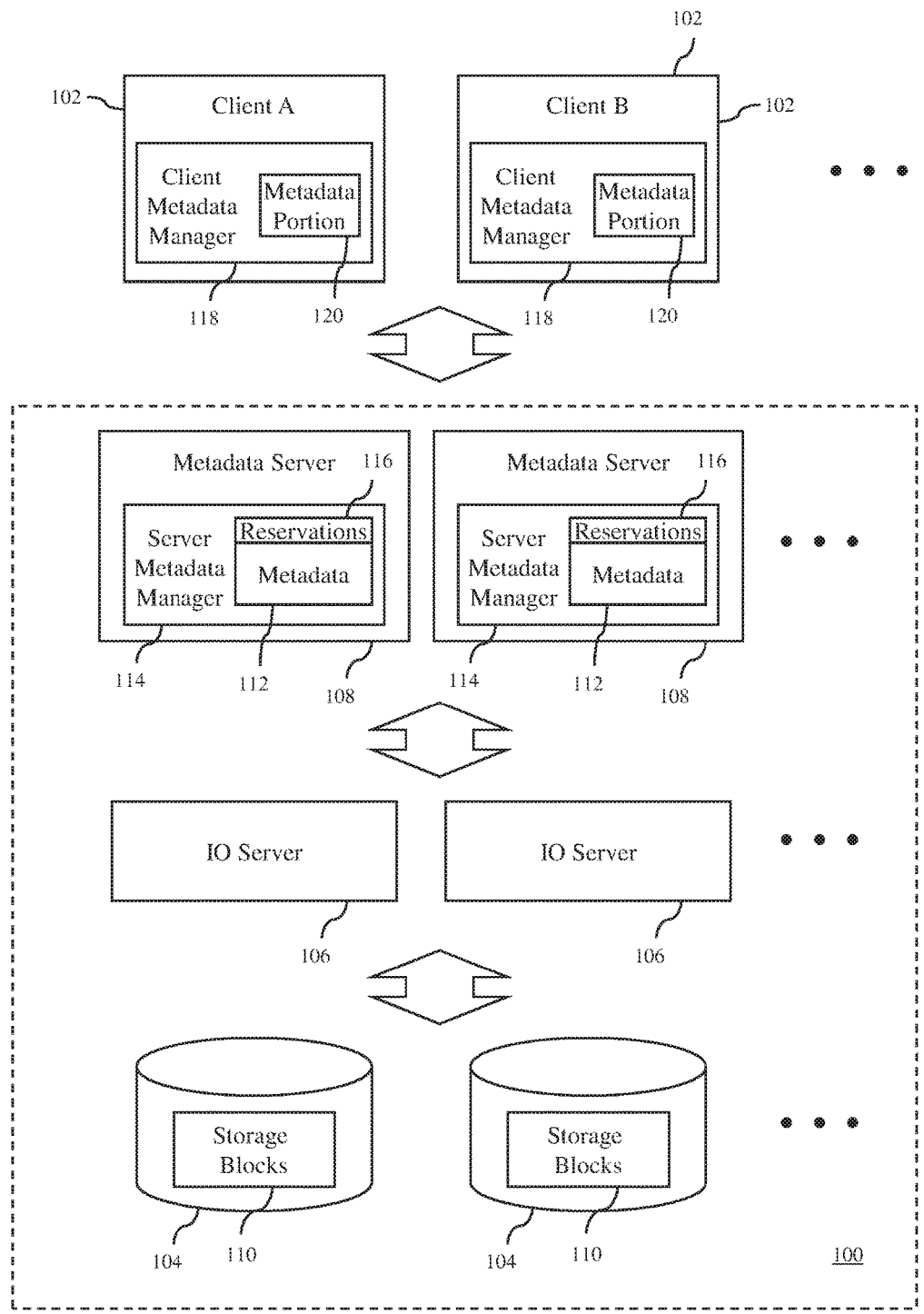
FIG. 1 is a block diagram of a distributed storage system in accordance with an embodiment of the invention.

FIG. 1 depicts a distributed storage system 100 in accordance with an embodiment of the invention is shown. The distributed storage system can be accessed by clients 102 to perform data operations on the distributed storage system, such as read and write operations. As used herein, a "client" can be any software entity that can run on a computer system, such as a software application, a software process, a virtual machine (VM) or a "virtual container" that provides system-level process isolation. In addition, a "client" can be any physical device, such as a physical server, a personal computer, a tablet, a laptop computer or a smartphone, that can access the distributed storage system. As described in more detail below, the distributed storage system is designed so that the clients can reserve portions of storage space and can independently allocate storage blocks from the reserved portions of the storage space. This reduces the amount of communications between the clients and the distributed storage system regarding metadata related to allocation of storage space, which translates to scalability and high performance for the distributed storage system.

As shown in FIG. 1, the distributed storage system 100 includes computer data storage devices 104, input/output (IO) servers 106 and metadata servers 108. The distributed storage system is scalable, and thus, the number of data storage devices, IO servers and metadata servers included in the storage system can be changed as needed to increase or decrease the capacity of the storage system to support increase/decrease in workload. Consequently, the exact number of data storage devices, IO servers and metadata servers included in the storage system can vary from tens to hundreds or more.

The data storage devices 104 of the distributed storage system 100 can be any type of non-volatile storage devices that are commonly used for data storage. As an example, the data storage devices may be, but not limited to, solid-state devices (SSDs), hard disks or a combination of the two. The storage space provide by the data storage devices is divided into storage blocks 110, which may be disk blocks, disk sectors or other storage device sectors. These storage blocks may either be allocated or free (i.e., available for allocation). An example of the storage blocks of the data storage devices is illustrated in FIG. 2.

Figure 2:
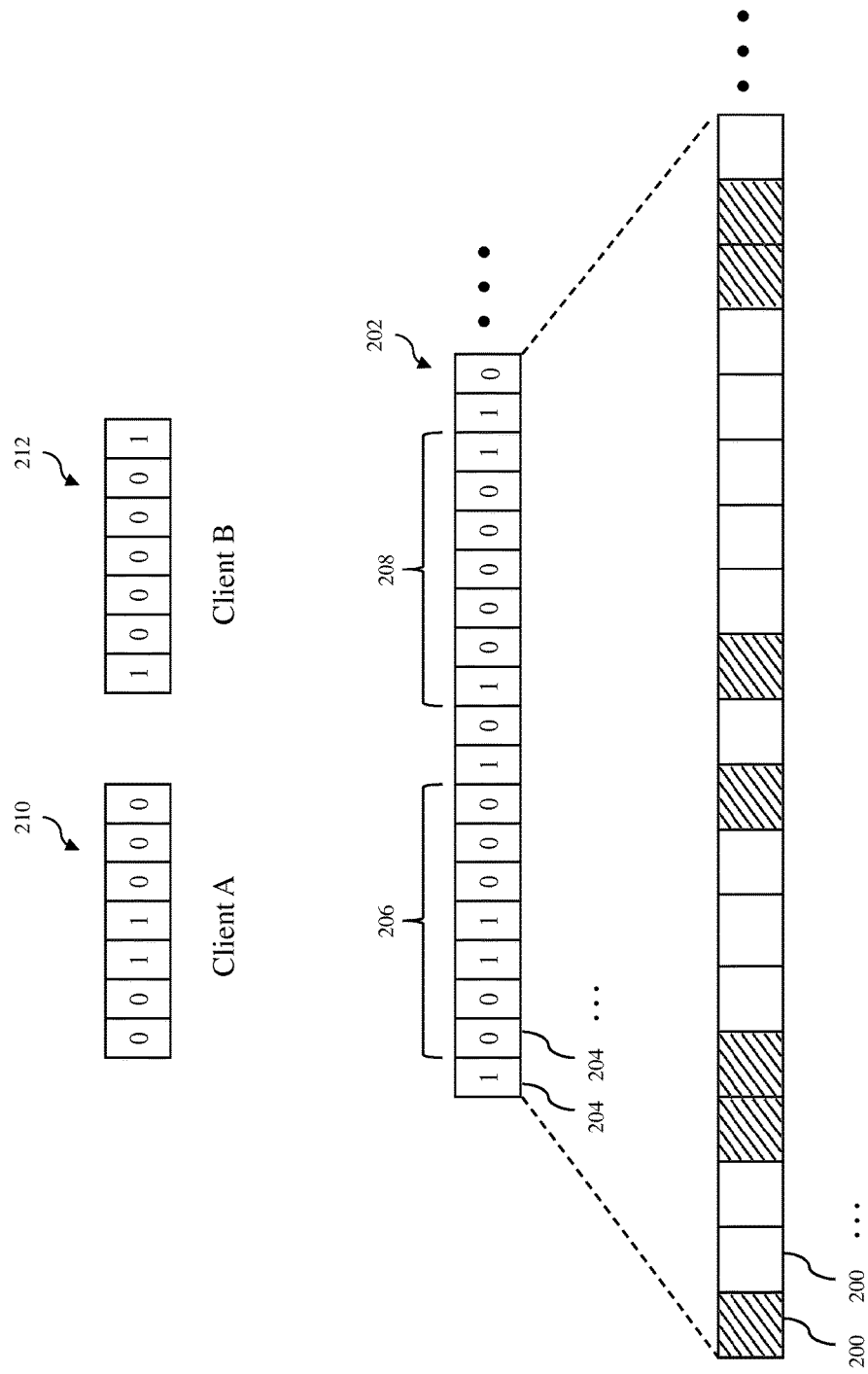
FIG. 2 is a diagram illustrating examples of storage blocks of data storage devices, a bitmap data structure, portions of the bitmap data structure reserved by clients in accordance with an embodiment of the invention.

In FIG. 2, a number of storage blocks 200, which may be provided by the data storage devices 104 of the distributed storage system 100, is illustrated. The allocated storage blocks are illustrated as hatch patterned boxes, while the free storage blocks are illustrated as blank boxes. When a client wants to write into a new storage block of the distributed storage system 100, the client needs to know which of the storage blocks are free or available and which of the storage blocks have been allocated. This information regarding the storage blocks is managed as metadata by the metadata servers 108 of the distributed storage system 100, as described below.

Turning back to FIG. 1, the IO servers 106 of the distributed storage system 100 operate to interface between the clients 102 and the data storage devices 104 to facilitate data operations with respect to the data storage devices. The IO servers may manage low-level data storage tasks, such as request scheduling and data layout. In some embodiments, the IO servers may organize data and present a simple object-based data access interface to the clients.

The metadata servers 108 of the distributed storage system 100 operate to manage metadata associated with the storage blocks 110 of the data storage devices 104, including metadata that indicates which storage blocks of the data storage devices have been allocated and which storage blocks of the data storage devices are free. This type of metadata is sometimes referred to herein as storage block allocation metadata. Each metadata server is designated to manage storage block allocation metadata that corresponds to a set of storage blocks, which may be defined by the data storage device or devices being supported by that metadata server or by some other criterion. In the illustrated embodiment, each metadata server maintains the storage block allocation metadata in a metadata data structure 112. In some implementations, the metadata data structure is a bitmap data structure that includes a number of bits equal to the number of storage blocks being managed by that metadata server. Each bit of the bitmap data structure corresponds to a storage block and the value of that bit represents whether the corresponding storage block has been allocated or is free. As an example, a "0" bit may represent that the corresponding storage block is free and a "1" bit may represent that the corresponding storage block has been allocated. In FIG. 2, an example of a bitmap data structure that may be maintained in the metadata servers is illustrated in FIG. 2.

As shown in FIG. 2, a bitmap data structure 202 includes a number of bits 204 that correspond to the storage blocks 200. The bits of the bitmap data structure in this example have the following values: 1001100010100000110 . . . , which reflect the status of the corresponding storage blocks. In particular, the "1" bits of the bitmap data structure indicate that the corresponding storage blocks have been allocated and the "0" bits of the bitmap data structure indicate that the corresponding storage blocks are free or available.

A bitmap similar to the bitmap data structure 202 is typically used to inform clients which storage blocks are free or available so that the clients can write data into the available storage blocks. Thus, each time a client wants to write data into a new storage block, that client will have to communicate with one or more metadata servers with such a bitmap to determine which storage blocks are available. These communications between clients and metadata server or servers may limit the scalability of a distributed storage system and also degrade the performance of the distributed storage system.

In order to mitigate the undesirable effects of these client-server communications, the distributed storage system 100 allows any of the clients 102 to reserve a group of storage blocks and individually manage a portion of the metadata data structure 112, e.g., the bitmap data structure 202, that corresponds to that group of storage blocks using a copy of that portion of the metadata data structure, including the data contained in that portion. Thus, when one of the clients 102 has reserved a group of storage blocks and wants to write to a new storage block, that client can examine the copy of the portion of the metadata data structure to determine which storage blocks in the reserved group of storage blocks are available, allocate one or more storage blocks to itself and modify the copy of the portion of the metadata data structure accordingly without having to communicate with the metadata servers 108. As a result, the communications between the clients and the metadata servers can be significantly reduced. An example of portions of a metadata data structure that have been reserved for clients is illustrated in FIG. 2.

As shown in FIG. 2, two portions 206 and 208 of the bitmap data structure 202 have been reserved. The first bitmap portion 206 has been reserved for the client A and the second bitmap portion has been reserved for the client B. Thus, a copy 210 of the first bitmap portion 206 is managed by the client A and a copy 212 of the second bitmap portion 208 is managed by the client B. The copies of the bitmap portions may be stored in any storage accessible by the client A and client B. These clients would then use their respective copies of the bitmap portions to manage their storage block needs by selectively allocating available storage blocks to themselves or freeing previously allocated storage blocks. When free storage blocks represented in the copies of the bitmap portions have been allocated by the clients, the corresponding copies of the bitmap portions are modified to reflect the newly allocated storage blocks. Similarly, when allocated storage blocks represented in the copies of the bitmap portions have been freed or made available by the clients, the corresponding copies of the bitmap portions are modified to reflect the newly freed storage blocks. Any differences between the copies of the bitmap portions and the original portions of the bitmap data structure can be reconciled at a later time, as explained below.

Turning back to FIG. 1, each metadata server 108 includes a server metadata manager 114 that manages the metadata data structure 112 of that metadata server. The server metadata manager of each metadata server modifies the storage block allocation information in the metadata data structure 112 of that metadata server according to status changes to the corresponding storage blocks. Thus, as storage blocks are freed, the server metadata manager will change the storage block allocation information in the respective metadata data structure to reflect the freed storage blocks. Similarly, as storage blocks are allocated, the server metadata manager will change the storage block allocation information in the respective metadata data structure to reflect the allocated storage blocks. However, the server metadata manager does not allocate any storage blocks that are represented in any reserved portion of the metadata data structure. In addition, the server metadata manager manages information 116 regarding storage block reservations made by the clients 102. The storage block reservation information includes at least the identification of the portions of the metadata data structure that have been reserved and the identification of the clients that have reserved those portions of the metadata data structure.

In some embodiments, the storage block reservation information 116 of a metadata server 108 may be embedded in the metadata data structure 112 of that metadata structure. Thus, in these embodiments, the metadata data structure would contain the storage block allocation information that indicates which storage blocks have been allocated or available, as well as the storage block reservation information that indicates the portions of the metadata data structure that have been reserved and the clients that own these reservations. An example of a metadata data structure with embedded storage block reservation information is illustrated in FIG. 3.

Figure 3:
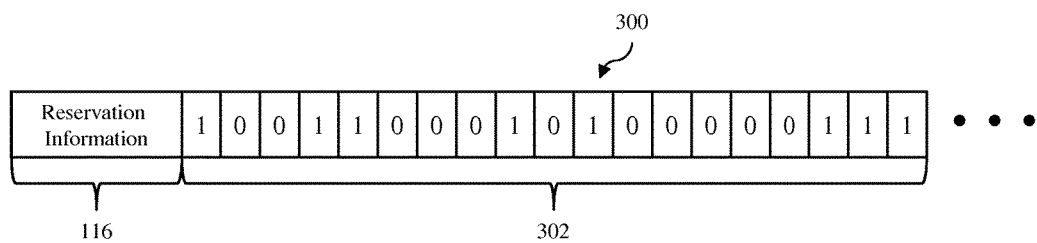
FIG. 3 is a diagram illustrating an example of a metadata data structure with embedded storage block reservation information in accordance with an embodiment.

In FIG. 3, a metadata data structure 300 includes storage block allocation information 302 in the form of a bitmap and the storage block reservation information 116. In this example, the storage block reservation information is located at the beginning of the metadata data structure. However, in other embodiments, the storage block reservation information can be located anywhere in the metadata data structure.

Figure 4:
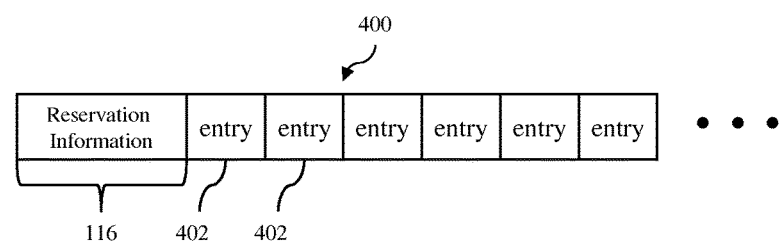
FIG. 4 is a diagram illustrating an example of a summary metadata data structure with embedded storage block reservation information in accordance with an embodiment of the invention.

In other embodiments, the storage block reservation information 116 may be embedded in another data structure, such as a summary metadata data structure, which is separate from the metadata data structure. An exemplary summary metadata data structure 400 with the embedded storage block reservation information is illustrated in FIG. 4. In the illustrated embodiment, the summary metadata data structure includes a number of summary metadata entries 402, each of which corresponds to a segment of the metadata data structure 202, which may be in the form of a bitmap data structure, that corresponds to multiple storage blocks. Each summary metadata entry provides information that summarizes the corresponding segment of the metadata data structure. In a particular implementation, each summary metadata entry includes the number of free storage blocks indicated in the corresponding segment of the metadata data structure and the maximum contiguous free extent in the corresponding segment of the metadata data structure. The summary metadata entry information allows the respective metadata server 108 to load the summary metadata data structure into memory when searching for free storage blocks without having to load the entire metadata data structure, which could be very large. When needed, certain segments of the metadata data structure can be selectively loaded into the memory of the metadata server to search for free storage blocks in response to storage allocation requests from one or more of the clients 102.

As illustrated in FIG. 4, the summary metadata data structure 400 also includes the storage block reservation information 116, which is located at the beginning of the summary metadata data structure. However, in other embodiments, the storage block reservation information can be located anywhere in the summary metadata data structure. In other embodiments, the storage block reservation information may be embedded in a higher-level summary metadata data structure, which may contain summary information regarding a lower-level summary metadata data structure.

Turning back to FIG. 1, each of the clients 102 that can interface with the distributed storage system 100 includes a client metadata manager 118, which manage a copy of a portion 120 of the bitmap data structure 112 that has been reserved for that client. Each client metadata manager can communicate with one or more of the metadata servers 108 to request a reservation of a group of the storage blocks 110 being managed by the metadata servers. The reservation request may include at least an identification of the client making the request. In some embodiments, the reservation request may also include the overall size of the storage blocks being requested for reservation, which may be represented by the number of the storage blocks being requested for reservation. The overall size of the storage blocks being requested may be static or dynamic. If dynamic, the overall size of the storage blocks being requested may be computed using a prediction algorithm based on past storage block usage or workload of the client and/or current free storage space of the distributed storage system 100. This algorithm to compute the overall size of the storage blocks that should requested for a particular client may be executed at that client or at the metadata server where the reservation is being requested.

When the request is transmitted to one of the metadata servers 108, the server metadata manager 114 of that metadata server handles the request by reserving a portion of the metadata data structure 112 that corresponds to a group of storage blocks, which has the appropriate size. The server metadata manager then records the reservation by modifying the storage block reservation information 116. The sever metadata manager also makes a copy of the portion of the metadata data structure that has been reserved to the requesting client and transmits that copy to the requesting client.

When the copy of the reserved portion of the metadata data structure is received by the requesting client, the copy of the reserved portion of the metadata data structure is managed by the client metadata manager of that client to handle storage block allocation needs of that client. Thus, when the client needs one or more free storage blocks so that the client can write into these storage blocks, the client metadata manager of the client can search for free storage blocks using the copy of the reserved portion of the metadata data structure to allocate the needed storage blocks. The client metadata manager can also allocate one or more of the free storage blocks to the client and record the allocation on the copy of the reserved portion of the metadata data structure. In addition, when the client needs free one or more previously allocated storage blocks represented in the copy of the reserved portion of the metadata data structure, the client metadata manager of the client can release the allocated storage blocks and record newly freed storage blocks on the copy of the reserved portion of the metadata data structure. Thus, the use of reserved portions of the metadata data structures at the clients eliminates the need for the clients to communicate with the metadata servers for storage block allocation/release requests when those requests can be satisfied using the reserved portions of the metadata data structures at the respective clients. In addition, since the clients only have copies of the reserved portions of the metadata data structures and the original or source metadata data structures are maintained at the metadata servers, malfunction of one or more of the clients does not affect the storage allocation capabilities of the metadata servers, as well as other functioning clients that may be managing different portions of the source metadata data structures. In cases where a client dies "permanently", garbage collection or other mechanism can be used to clean the storage blocks that may have been used by that client.

The copies of the reserved portions of the metadata data structure at the clients can be reconciled with the corresponding portions of the metadata data structure at the source metadata servers as needed or according to a predefined schedule. As an example, when there is insufficient number of free storage blocks according to the copy of the reserved portion of the metadata data structure at a particular client, a metadata reconciliation operation can be performed, which involves transmitting the current copy of the reserved portion of the metadata data structure to the source metadata server so that the metadata data structure at the source metadata server can be modified to reflect any changes (i.e., newly allocated storage blocks or newly freed storage blocks) in the current copy of the reserved portion of the metadata data structure. In a particular implementation, a bitwise mask and set operation can be used to reconcile the copy of the reserved portion of the metadata data structure from the client with the corresponding portion of the metadata data structure at the source metadata server. In this example, after the metadata reconciliation, another portion of the metadata data structure that corresponds to a group of storage blocks with sufficient number of free storage blocks may be reserved for that client and a copy of a new portion of the metadata data structure may be transmitted to the client to be managed by that client.

As noted above, the clients 102 can be any software entity or any physical device. In some embodiments, one or more of the clients may be host computers that support one or more VMs or virtual containers. An example of such a host computer is illustrated in FIG. 5.

Figure 5:
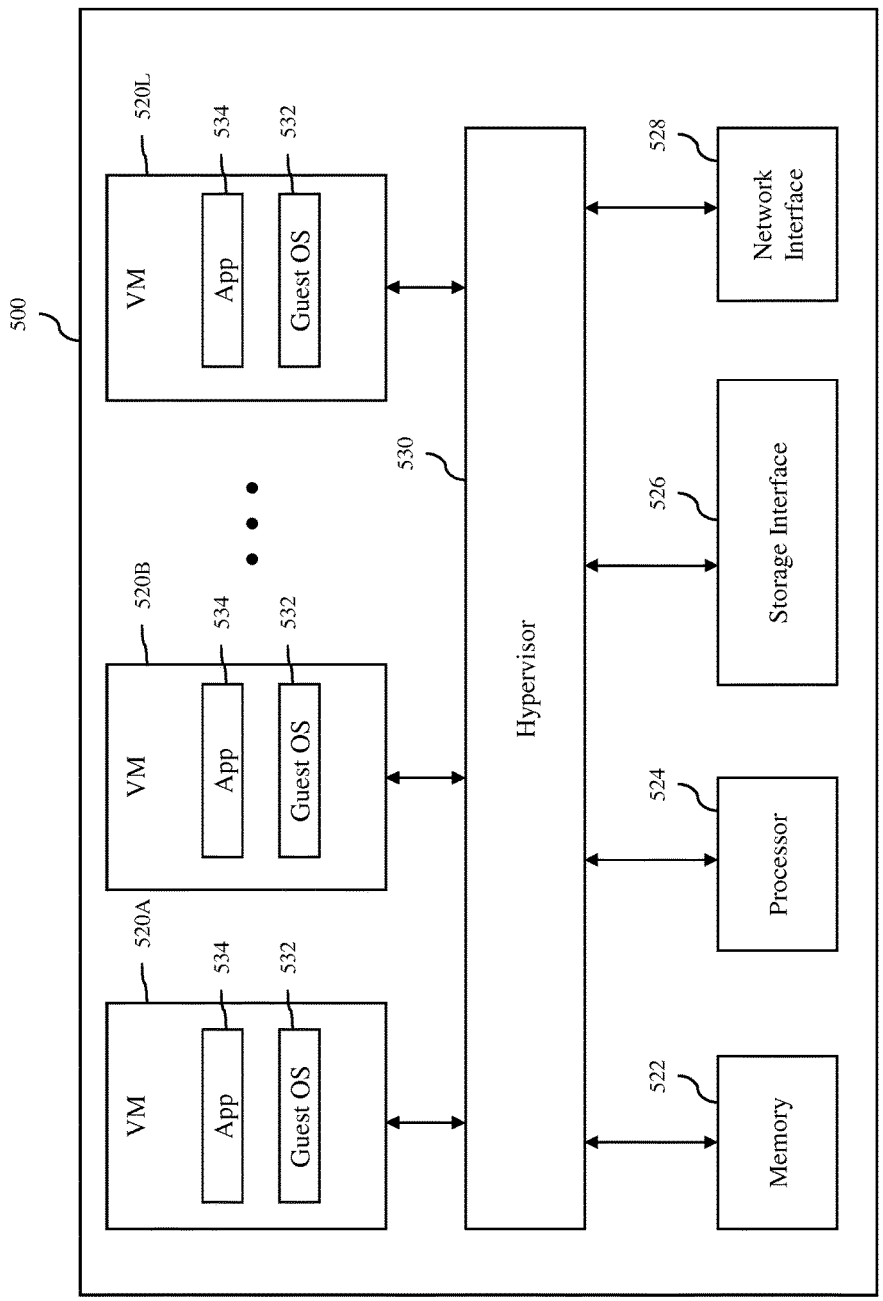
FIG. 5 is a block diagram of a client in the form of a host computer in accordance with an embodiment of the invention.

FIG. 5 shows a host computer 500 that can represent one or more of the clients 102. In FIG. 5, the physical connections between the various components of the host computer are not illustrated. In the illustrated embodiment, the host computer is configured to support a number of processing entities 520A, 520B . . . 520L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 522, one or more processors 524, a storage interface 526, and a network interface 528. Each system memory 522, which may be random access memory (RAM), is the volatile memory of the host computer. Each processor 524 can be any type of a processor, such as a central processing unit (CPU) commonly found in a server. In some embodiments, each processor may be a multi-core processor, and thus, includes multiple independent processing units or cores. The storage interface 526 is an interface that allows that host computer to communicate with storage. As an example, the storage interface may be a host bus adapter or a network file system interface. The network interface 528 is an interface that allows the host computer to communicate with other devices connected to the same network. As an example, the network interface may be a network adapter.

In the illustrated embodiment, the VMs 520A, 520B . . . 520L run on "top" of a hypervisor 530, which is a software interface layer that, using virtualization technology, enables sharing of the hardware resources of the host computer 500 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 532 and one or more guest applications 534. The guest operating system manages virtual system resources made available to the corresponding VM by the hypervisor, and, among other things, the guest operating system forms a software platform on top of which the guest applications run.

The host computer 500 further includes the client metadata manager 118 (not shown in FIG. 5) that can interface with one or more of the server metadata managers 114 of the metadata servers 108 and manage any copy of a portion of the metadata data structure from the metadata servers to handle storage block management for the host computer, including the VMs 520A, 520B . . . 520L being hosted in the host computer.

Turning back to FIG. 1, the client metadata managers 118 of the clients and the server metadata managers 114 of the metadata servers 108 may be implemented in any combination of software, hardware and firmware. In one embodiment, each of these client and server metadata managers is implemented as one or more software programs running on a physical computer system with one or more processors, memory and other computer components commonly found on a personal computer or a physical server. In addition, in some embodiments, each of the IO servers 106 and the metadata servers 108 may be a physical computer, and thus, includes memory and one or more processors, as well as other components commonly found in a computer system. In other embodiments, each of the IO and metadata servers may be implemented as one or more software programs running on one or more physical computers.

Figure 6:
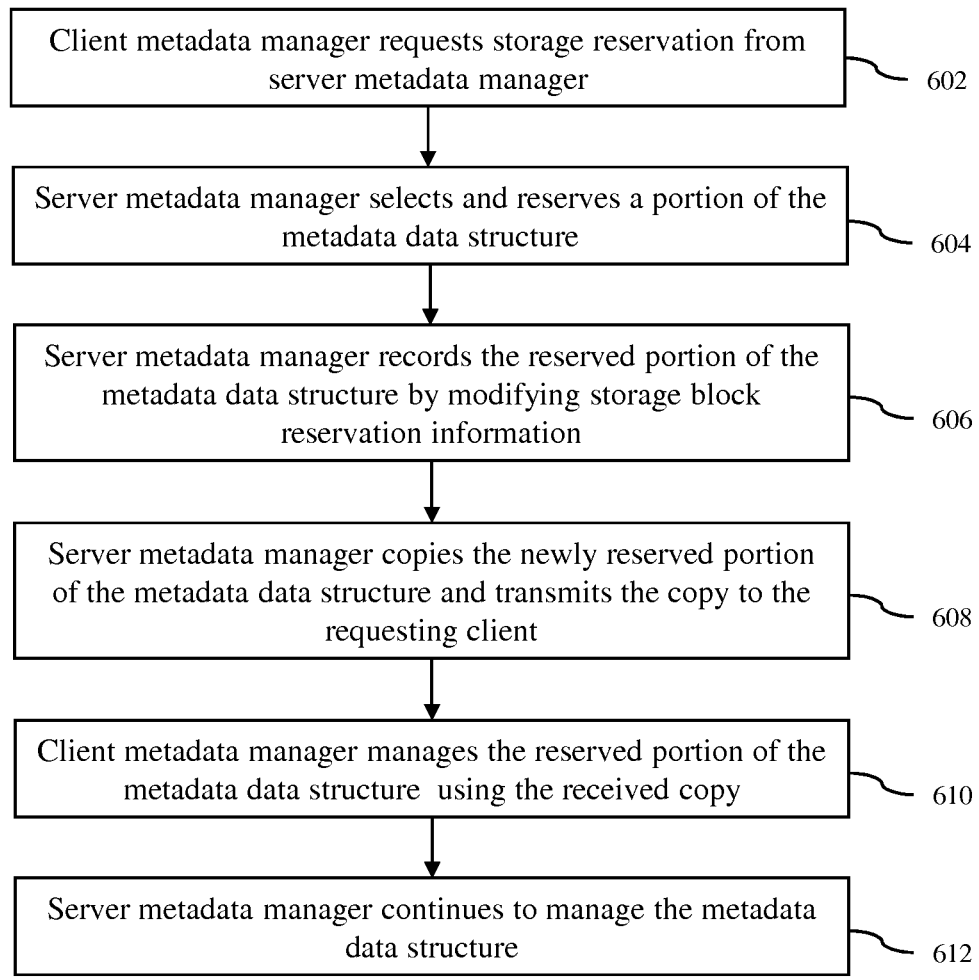
FIG. 6 is a process flow diagram of a storage reservation operation using the distributed storage system in accordance with an embodiment of the invention.

A storage reservation operation using the distributed storage system 100 in accordance with an embodiment of the invention is now described with reference to the process flow diagram of FIG. 6. Since the storage reservation operation may involve clients and metadata servers on different host computers, the transactions between the clients and the metadata servers for the storage reservation operation should be distributed transactions. As an example, a two-phase commit protocol can be used for the transactions of the storage reservation operation.

At block 602, the client metadata manager of a client (i.e., one of the clients 102) requests a storage reservation from the server metadata manager of a metadata server (i.e., one of the metadata servers 108). The storage reservation request may include the overall size of the storage blocks being requested. Next, at block 604, in response to the request, the server metadata manager selects and reserves a portion of the metadata data structure being managed by the server metadata manager that corresponds to a group of storage blocks provided by the data storage devices 104. If the overall size of the storage blocks being requested is not indicated in the storage reservation request, the server metadata manager may compute the overall size of the storage blocks that should be reserved for the requesting client. Alternatively, the server metadata manager may simply use a default size for the storage blocks being reserved. The portion of the metadata data structure may be selected based on at least the number of free storage blocks indicated in that portion. The portion of the metadata data structure may also be selected so that the selected portion does not overlap any previously reserved portion of the metadata data structure. Next, at block 606, the server metadata manager records the reserved portion of the metadata data structure by modifying the storage block reservation information 116, which may be stored as data in the metadata data structure 112 or in another data structures, such as a summary metadata data structure.

Next, at block 608, the server metadata manager copies the newly reserved portion of the metadata data structure and transmits the copy of the reserved portion of the metadata data structure to the requesting client. Next, at block 610, the client metadata manager of the requesting client manages the reserved portion of the metadata data structure using the received copy of the reserved portion of the metadata data structure, e.g., to allocate free storage blocks indicated in the reserved portion of the metadata data structure to the client and to release storage blocks indicated in the reserved portion of the metadata data structure that had been allocated to the requesting client. At block 612, the server metadata manager of the source metadata server continues to manage the metadata data structure without allocating any storage blocks that correspond to any reserved portion of the metadata data structure, including the portion of the metadata data structure that has been reserved to the requesting client. However, the server metadata manager of the source metadata server allows other clients to release any previously allocated storage blocks, even allocated storage blocks represented in any reserved portion of the metadata data structure.

Figure 7:
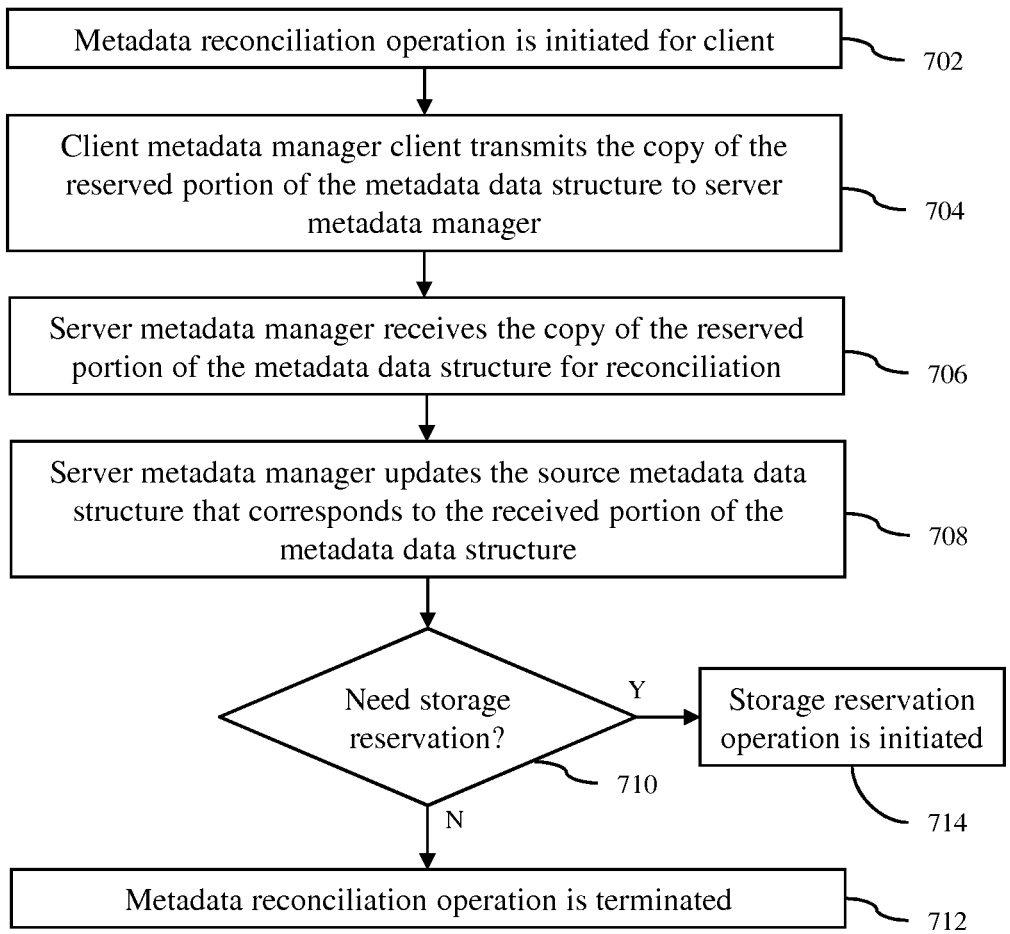
FIG. 7 is a process flow diagram of a metadata reconciliation operation with respect to the distributed storage system in accordance with an embodiment of the invention.

A metadata reconciliation operation with respect to the clients and the distributed storage system in accordance with an embodiment of the invention is now described with reference to the process flow diagram of FIG. 7. Similar to the storage reservation operation, since the metadata reconciliation operation may involve clients and metadata servers on different host computers, the transactions between the clients and the metadata servers for the metadata reconciliation operation should be distributed transactions. As an example, a two-phase commit protocol can be used for the transactions of the metadata reconciliation operation.

At block 702, a metadata reconciliation operation is initiated for a client (i.e., one of the clients 102) due to a triggering condition. As an example, a triggering condition may be when there is insufficient number of free storage blocks in the group of storage blocks corresponding to the reserved portion of the metadata data structure being managed by that client. As another example, a triggering condition may be a specified moment in time according to a schedule. At block 704, the client metadata manager of the client transmits the copy of the reserved portion of the metadata data structure that was being managed by the client metadata manager to the server metadata manager of the source metadata server.

Next, at block 706, the server metadata manager updates the source metadata data structure (i.e., the original metadata data structure to which the reserved portion belongs) according to the received portion of the metadata data structure. Thus, the source metadata data structure is updated with any new allocations of storage blocks represented in the received portion of the metadata data structure. In addition, the source metadata data structure is updated with any releases of storage blocks represented in the received portion of the metadata data structure that were originally indicated as being allocated. However, any newly freed storage blocks (i.e., storage blocks freed by one or more other clients) represented in the source metadata data structure are not changed even if they conflict with the received portion of the metadata data structure since these storage blocks would have been freed by other clients.

Next, at block 710, a determination is made whether the client needs another storage block reservation, which may be a new storage block reservation or the same storage block reservation. If the client no longer needs a storage block reservation, then the operation comes to an end, at block 712. However, if the client needs a storage block reservation, then the operation proceeds to block 714, where a storage reservation operation is initiated.

In this fashion, the metadata data structures 112 at the metadata servers 108 can be reconciled with reserved portions of the metadata data structures that were managed by the clients 102. This process ensures that the metadata data structures at the metadata servers will be updated to reflect the true allocation status of the storage blocks 110 provided by the data storage devices 104. In order to ensure that storage spaces reservations are properly made and properly returned, the transactions for making and returning storage space reservations may be atomic transactions using, for example, two-phase commit processes.

Figure 8:
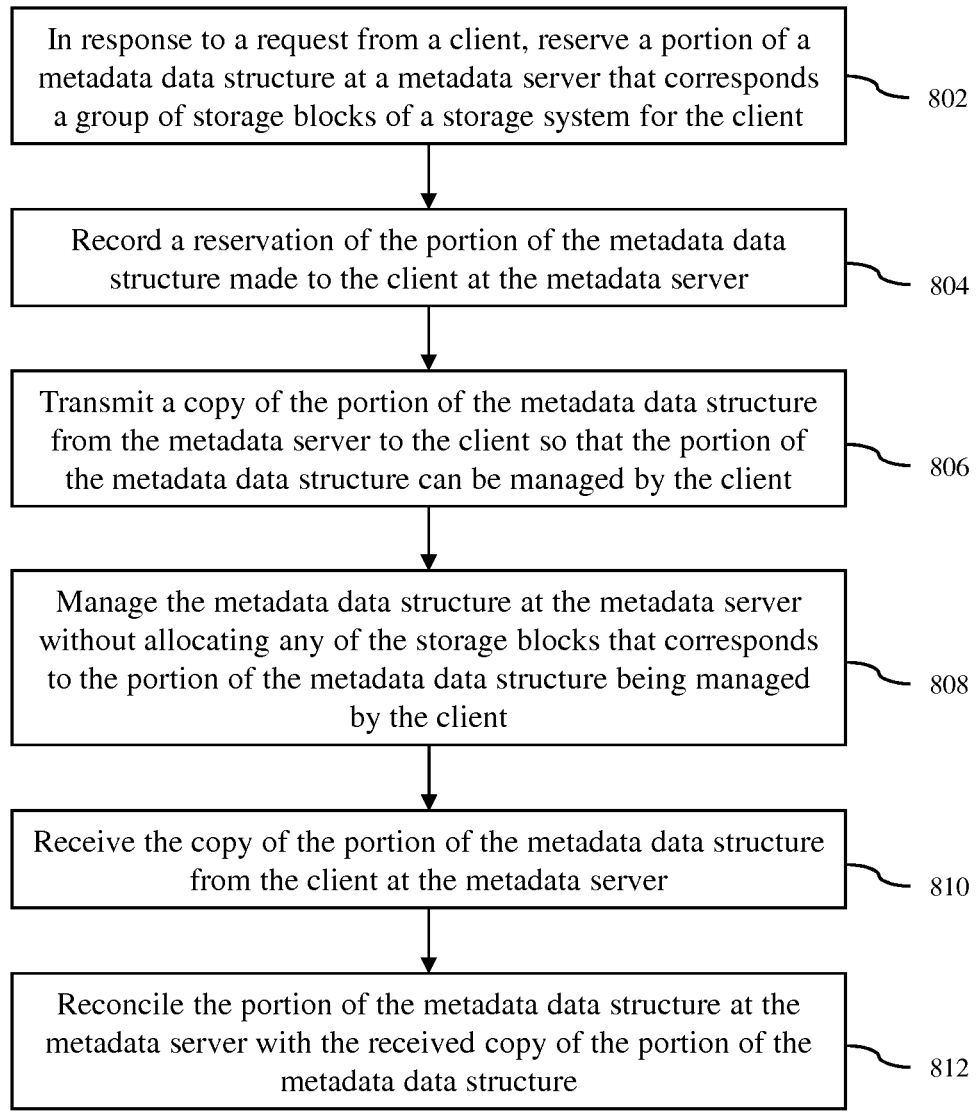
FIG. 8 is a flow diagram of a method for distributing storage management metadata in accordance with an embodiment of the invention.

A method for distributing storage metadata management in accordance with an embodiment of the invention is now described with reference to the process flow diagram of FIG. 8. At block 802, in response to a request from a client, a portion of a metadata data structure at a metadata server that corresponds a group of storage blocks of a storage system is reserved for the client. The metadata data structure contains allocation information of storage blocks of the storage system. Next, at block 804, a reservation of the portion of the metadata data structure made to the client is recorded at the metadata server. Next, at block 806, a copy of the portion of the metadata data structure is transmitted from the metadata server to the client so that the portion of the metadata data structure can be managed by the client. Next, at block 808, the metadata data structure is managed at the metadata server without allocating any of the storage blocks that corresponds to the portion of the metadata data structure being managed by the client. In addition, another client is allowed to free a storage block that is indicated in the portion of the metadata data structure as being allocated even though the portion of the metadata data structure has been reserved for the client. Next, at block 810, the copy of the portion of the metadata data structure from the client at the metadata server is received at the metadata server. Next, at block 812, the portion of the metadata data structure at the metadata server is reconciled with the received copy of the portion of the metadata data structure.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Also, some of the steps can be repeated multiple times.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for distributing management of storage metadata, the method comprising:
   in response to a request from a client, reserving a portion of a metadata data structure at a metadata server that corresponds a group of storage blocks of a storage system for the client, the metadata data structure containing allocation information of the storage blocks of the storage system;
   recording a reservation of the portion of the metadata data structure made to the client at the metadata server;
   transmitting a copy of the portion of the metadata data structure from the metadata server to the client so that the portion of the metadata data structure can be managed by the client, wherein the client selectively allocates available storage blocks using the copy of the portion of the metadata data structure thereby reducing communications between the client and the metadata server;
   managing the metadata data structure at the metadata server without allocating any of the storage blocks that have been reserved for the client, including allowing another client to free an allocated storage block that has been reserved for the client and has been allocated to the another client while the client is managing the available storage blocks using the copy of the portion of the metadata data structure;
   receiving the copy of the portion of the metadata data structure from the client at the metadata server; and
   reconciling the portion of the metadata data structure at the metadata server with the received copy of the portion of the metadata data structure, wherein the copy of the portion of the metadata data structure contains allocation information of a first storage block available for allocation to the client and allocation information of a second storage block allocated to the another client, wherein reconciling the portion of the metadata data structure at the metadata server includes updating the portion of the metadata data structure with the received copy of the portion of the metadata data structure to update the allocation information of the first storage block available for allocation to the client without updating the allocation information of the second storage block allocated to the another client.

2. The method of claim 1, wherein the metadata data structure includes a bitmap data structure, each bit in the bitmap data structure indicating whether a corresponding storage block has been allocated or available for allocation.

3. The method of claim 1, wherein recording reservation of the portion of the metadata data structure includes recording the reservation of the portion of the metadata data structure made to the client in the metadata data structure.

4. The method of claim 1, wherein recording reservation of the portion of the metadata data structure includes recording the reservation of the portion of the metadata data structure made to the client in a summary metadata data structure that contains summary information of different segments of the metadata data structure.

5. The method of claim 1, further comprising:
   in response to a different request from another client, reserving another portion of the metadata data structure that corresponds to another group of storage blocks of the storage system for the another client; and
   transmitting a copy of the another portion of the metadata data structure to the another client so that the another portion of the metadata data structure can be managed by the another client.

6. The method of claim 1, wherein a transaction between the client and the metadata server is a distributed transaction.

7. The method of claim 1, wherein the size of the portion of the metadata data structure is dynamic.

8. A non-transitory computer-readable storage medium containing program instructions for a method for distributing management of storage metadata, wherein execution of the program instructions by one or more processors of a computer system causes the one or more processors to perform steps comprising:
   in response to a request from a client, reserving a portion of a metadata data structure at a metadata server that corresponds a group of storage blocks of a storage system for the client, the metadata data structure containing allocation information of the storage blocks of the storage system;
   recording a reservation of the portion of the metadata data structure made to the client at the metadata server;
   transmitting a copy of the portion of the metadata data structure from the metadata server to the client so that the portion of the metadata data structure can be managed by the client, wherein the client selectively allocates available storage blocks using the copy of the portion of the metadata data structure thereby reducing communications between the client and the metadata server;
   managing the metadata data structure at the metadata server without allocating any of the storage blocks that have been reserved for the client, including allowing another client to free an allocated storage block that has been reserved for the client and has been allocated to the another client while the client is managing the available storage blocks using the copy of the portion of the metadata data structure;

receiving the copy of the portion of the metadata data structure from the client at the metadata server; and reconciling the portion of the metadata data structure at the metadata server with the received copy of the portion of the metadata data structure, wherein the copy of the portion of the metadata data structure contains allocation information of a first storage block available for allocation to the client and allocation information of a second storage block allocated to the another client, wherein reconciling the portion of the metadata data structure at the metadata server includes updating the portion of the metadata data structure with the received copy of the portion of the metadata data structure to update the allocation information of the first storage block available for allocation to the client without updating the allocation information of the second storage block allocated to the another client.

9. The computer-readable storage medium of claim 8, wherein the metadata data structure includes a bitmap data structure, each bit in the bitmap data structure indicating whether a corresponding storage block has been allocated or available for allocation.

10. The computer-readable storage medium of claim 8, wherein recording reservation of the portion of the metadata data structure includes recording the reservation of the portion of the metadata data structure made to the client in the metadata data structure.

11. The computer-readable storage medium of claim 8, wherein recording reservation of the portion of the metadata data structure includes recording the reservation of the portion of the metadata data structure made to the client in a summary metadata data structure that contains summary information of different segments of the metadata data structure.

12. The computer-readable storage medium of claim 8, wherein the steps further comprise:

in response to a different request from another client, reserving another portion of the metadata data structure that corresponds to another group of storage blocks of the storage system for the another client; and transmitting a copy of the another portion of the metadata data structure to the another client so that the another portion of the metadata data structure can be managed by the another client.

13. The computer-readable storage medium of claim 8, wherein a transaction between the client and the metadata server is a distributed transaction.

14. The computer-readable storage medium of claim 8, wherein the size of the portion of the metadata data structure is dynamic.

15. A system comprising:

a plurality of data storage devices that provides a plurality of storage blocks; and a metadata server that interfaces with at least some of the data storage devices and clients that access the data storage devices, the metadata server that:

in response to a request from a client, reserves a portion of a metadata data structure at a metadata server that corresponds a group of storage blocks of a storage system for the client, the metadata data structure containing allocation information of the storage blocks of the storage system;

records a reservation of the portion of the metadata data structure made to the client at the metadata server;

transmits a copy of the portion of the metadata data structure from the metadata server to the client so that the portion of the metadata data structure can be managed by the client, wherein the client selectively allocates available storage blocks using the copy of the portion of the metadata data structure thereby reducing communications between the client and the metadata server;

manage the metadata data structure at the metadata server without allocating any of the storage blocks that have been reserved for the client, including allowing another client to free an allocated storage block that has been reserved for the client and has been allocated to the another client while the client is managing the available storage blocks using the copy of the portion of the metadata data structure;

receives the copy of the portion of the metadata data structure from the client at the metadata server; and reconciles the portion of the metadata data structure at the metadata server with the received copy of the portion of the metadata data structure, wherein the copy of the portion of the metadata data structure contains allocation information of a first storage block available for allocation to the client and allocation information of a second storage block allocated to the another client, including updating the portion of the metadata data structure with the received copy of the portion of the metadata data structure to update the allocation information of the first storage block available for allocation to the client without updating the allocation information of the second storage block allocated to the another client.

16. The system of claim 15, wherein the metadata data structure includes a bitmap data structure, each bit in the bitmap data structure indicating whether a corresponding storage block has been allocated or available for allocation.

17. The system of claim 15, wherein the metadata server is configured to record the reservation of the portion of the metadata data structure made to the client in the metadata data structure or in a summary metadata data structure that contains summary information of different segments of the metadata data structure.

18. The system of claim 15, wherein the metadata server is further configured to:

in response to a different request from another client, reserve another portion of the metadata data structure that corresponds to another group of storage blocks of the storage system for the another client; and transmit a copy of the another portion of the metadata data structure to the another client so that the another portion of the metadata data structure can be managed by the another client.

19. The system of claim 15, wherein the system is configured such that a transaction between the client and the metadata server is a distributed transaction.

20. The system of claim 15, wherein the metadata server is configured such that the size of the portion of the metadata data structure is dynamic.

* * * * *